United States Patent
Hasegawa et al.

(10) Patent No.: US 9,277,441 B2
(45) Date of Patent: Mar. 1, 2016

(54) REGISTERING A MOBILE TERMINAL IN A VISITED NETWORK BASED ON A PRIORITY CLASS DOWNLOADED FROM A MOBILE NETWORK

(71) Applicant: NTT DOCOMO, INC., Chiyoda-ku, Tokyo (JP)

(72) Inventors: Toru Hasegawa, Tokyo (JP); Hironari Kobayashi, Tokyo (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 14/345,078

(22) PCT Filed: Jun. 6, 2013

(86) PCT No.: PCT/JP2013/003580
§ 371 (c)(1),
(2) Date: Mar. 14, 2014

(87) PCT Pub. No.: WO2013/187027
PCT Pub. Date: Dec. 19, 2013

(65) Prior Publication Data
US 2015/0126186 A1 May 7, 2015

(30) Foreign Application Priority Data
Jun. 15, 2012 (JP) ................................ 2012-135685

(51) Int. Cl.
*H04W 4/00* (2009.01)
*H04W 28/02* (2009.01)
(Continued)

(52) U.S. Cl.
CPC ............ *H04W 28/0226* (2013.01); *H04W 8/04* (2013.01); *H04W 28/02* (2013.01); *H04W 48/04* (2013.01); *H04W 60/04* (2013.01); *H04W 88/005* (2013.01)

(58) Field of Classification Search
CPC . H04W 28/02; H04W 28/0268; H04W 60/04; H04W 88/005; H04W 88/06; H04W 28/0226; H04W 48/04; H04W 8/04; H04W 8/06; H04W 8/065; H04W 8/08; H04W 8/082; H04W 8/087; H04W 8/14; H04W 8/18; H04W 8/20; H04W 8/26; H04W 28/26; H04W 8/02; H04W 8/10; H04W 60/00; H04W 72/1247; H04W 72/1252; H04B 7/18545; H04L 45/72; H04L 45/74
See application file for complete search history.

(56) References Cited

U.S. PATENT DOCUMENTS 6,360,096 B1    3/2002   Charpentier et al.
6,567,416 B1 *  5/2003   Chuah .......................... 370/418
(Continued)

FOREIGN PATENT DOCUMENTS

EP            1 838 053 A1    9/2007

OTHER PUBLICATIONS

NTT DoCoMo, Company Information, "Cellular Mobile Communication System—3. Location Registration" (online) (searched on Apr. 28, 2012), the Internet URL: https://www.nttdocomo.co.jp/corporate/technology/rd/tech/bn/cellular/03/index.html, 2 pages.
(Continued)

*Primary Examiner* — Meless Zewdu
(74) *Attorney, Agent, or Firm* — Crowell & Moring LLP

(57) ABSTRACT

When the priority class is set to a mobile terminal that has moved from cell to cell and even if an HLR is in a congestion state, a communication service is provided to the mobile terminal on a priority basis. A location registration signal, which is transmitted from a mobile terminal (2) that has moved from another area, and which is to be transmitted to an HLR (30), is received, and the apparatus corresponding to the movement source area is identified based upon the content of the location registration signal. Priority class information indicating whether the transmission process to the HLR is a priority process or a non-priority process is acquired from the identified another mobile communication control apparatus (200), and whether or not the location registration signal should be transmitted to the HLR (30) is determined based upon the acquired priority class information.

9 Claims, 12 Drawing Sheets

(51) Int. Cl.
*H04W 60/04* (2009.01)
*H04W 8/04* (2009.01)
*H04W 48/04* (2009.01)
*H04W 88/00* (2009.01)

(56) References Cited

U.S. PATENT DOCUMENTS

| | | | | |
|---|---|---|---|---|
| 8,339,954 | B2* | 12/2012 | Dahod | 370/231 |
| 2002/0126642 | A1* | 9/2002 | Shitama | 370/338 |
| 2006/0233144 | A1* | 10/2006 | Matsumoto | 370/338 |
| 2008/0002726 | A1* | 1/2008 | Haung et al. | 370/401 |
| 2010/0067449 | A1 | 3/2010 | Chen | |

OTHER PUBLICATIONS

PCT/JP2013/003580, PCT/IB/338 dated Dec. 24, 2014 (One (1) page).

PCT/JP2013/003580, International Preliminary Report on Patentability (PCT/IB/373) dated Dec. 16, 2014 (One (1) page).

PCT/JP2013/003580, English Translation of Written Opinion of the International Searching Authority (PCT/ISA/237) dated Sep. 10, 2013 (Three (3) pages).

Extended European Search Report dated Jun. 5, 2015 (Eight (8) pages).

* cited by examiner

FIG. 7
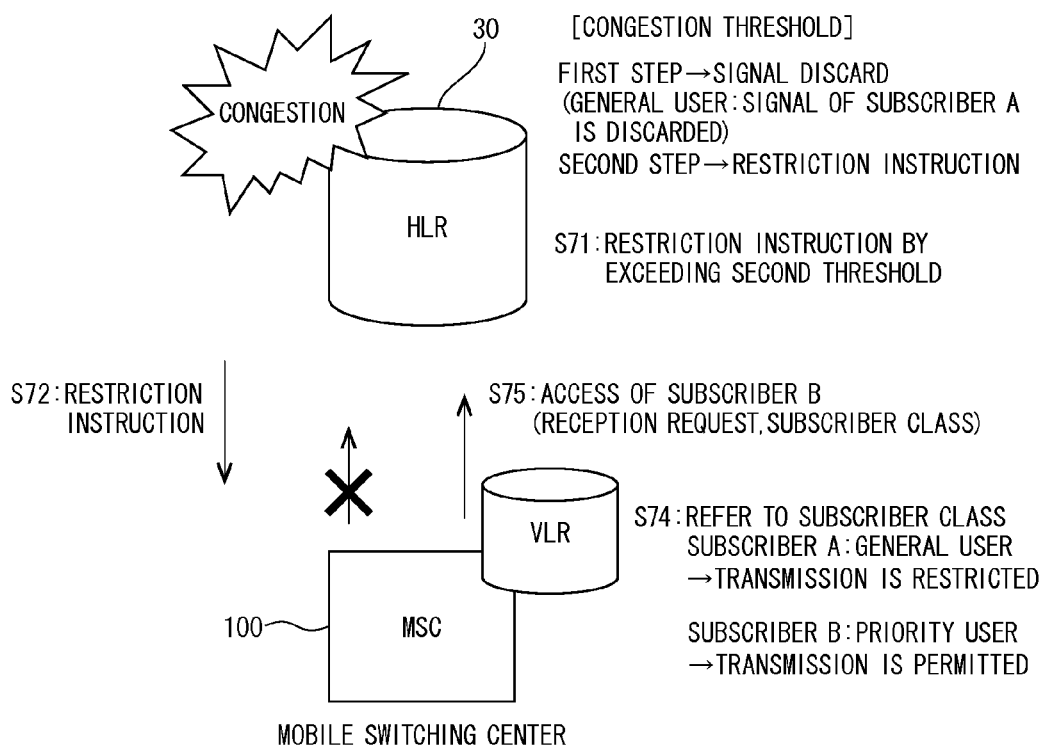
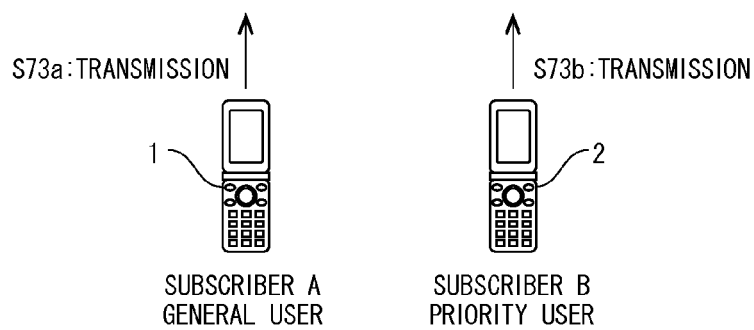

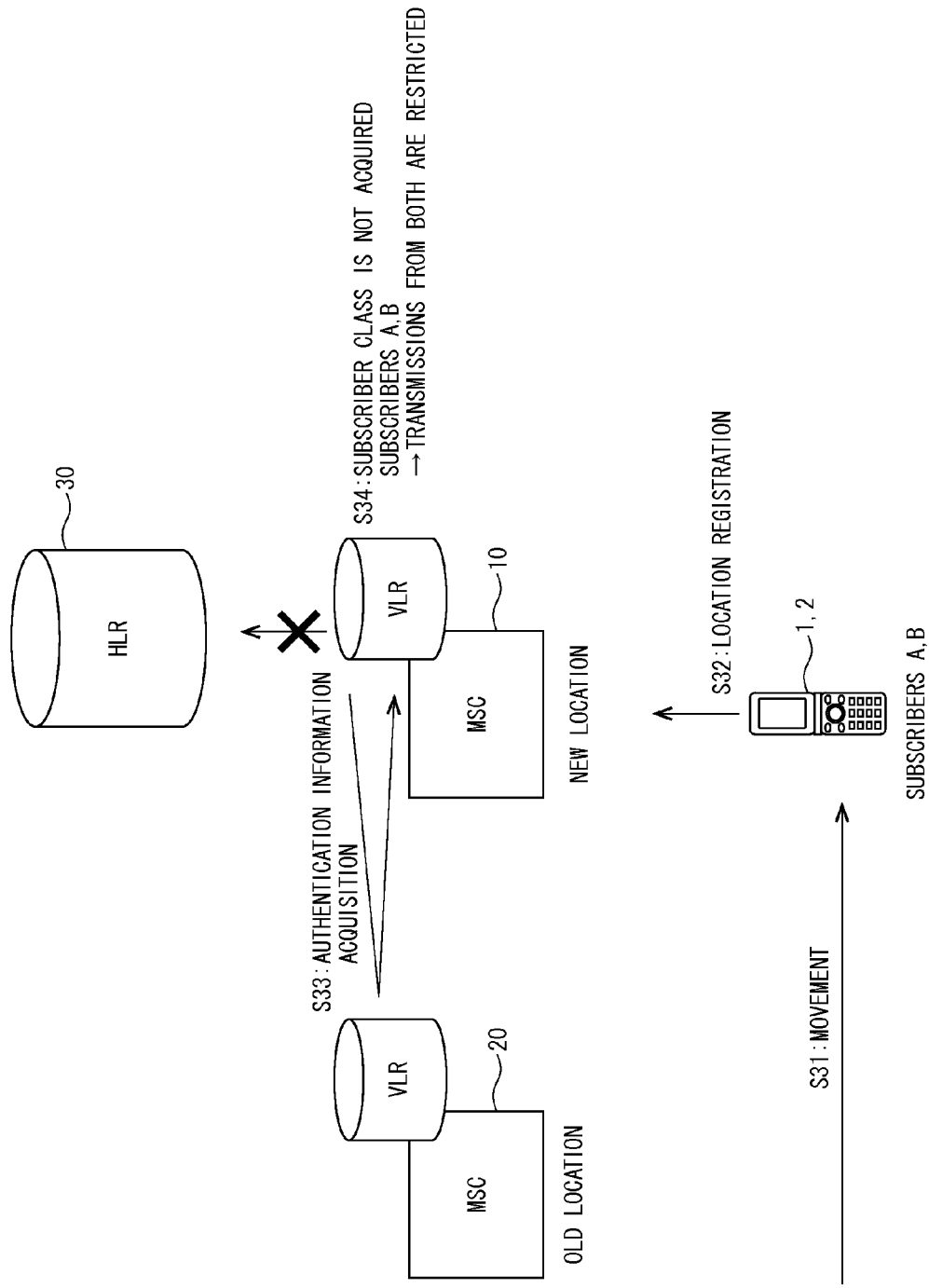

REGISTERING A MOBILE TERMINAL IN A VISITED NETWORK BASED ON A PRIORITY CLASS DOWNLOADED FROM A MOBILE NETWORK

TECHNICAL FIELD

The present invention relates to mobile communication control apparatuses, mobile communication systems, mobile communication control methods, and mobile communication control programs, and in particular, to a mobile communication control apparatus that performs a process of a location registration signal from a mobile terminal, a mobile communication system, a mobile communication control method, and a mobile communication control program.

BACKGROUND ART

Under a cellular mobile communication system, the location registration is needed in some cases in accordance with the movement of a mobile terminal (for example, see Non-Patent Literature 1). An example is that when there are first and second cells respectively corresponding to first and second mobile switching centers and a mobile terminal located in the first cell moves to the second cell (when moving from a cell to another cell), the above mobile terminal needs to perform the location registration. That is, when the mobile terminal moves over two mobile switching centers, the location registration is needed in the second cell, which is a new location.

Referring to FIG. 10, for example, when a mobile terminal 1 of a subscriber A located in the first cell, which is a previously located cell, moves to the second cell, which is a newly located cell (S11), the mobile terminal 1 of the subscriber A transmits a location registration signal (S12).

Upon receipt of the location registration signal transmitted from the mobile terminal 1, an MSC/VLR 10 corresponding to the newly located cell acquires authentication information about the subscriber A from an MSC/VLR 20 corresponding to the previously located cell (S13). Then, an authentication process is performed at the MSC/VLR 10. In addition, the MSC/VLR 10 is capable of identifying the MSC/VLR 20 corresponding to the first cell, which is the previously located cell, based upon information included in the location registration signal transmitted from the mobile terminal 1. Then, the MSC/VLR 10 outputs to the MSC/VLR 20 a request signal for acquiring the authentication information, and the MSC/VLR 20 transmits the authentication information as a reply signal to the request signal. In this manner, the MSC/VLR 10 is capable of acquiring the authentication information about the subscriber A.

Next, the MSC/VLR 20 transmits the location registration signal transmitted from the mobile terminal 1 to an HLR 30 (S14). As a result, the MSC/VLR 20 is capable of downloading subscriber information about the subscriber A from the HLR 30 (S15). Subsequently, the MSC/VLR 20 refers to the downloaded subscriber information, and controls an outgoing transmission and the like from the user.

It is to be noted, however, that the HLR 30 sometimes falls in a congestion state, when the mobile terminal is located in the cell corresponding to the MSC/VLR 20. The HLR in a congestion state means that the HLR apparatus itself is in a congestion state or a transmission path to reach the HLR is in a congestion state.

When the HLR 30 is in a congestion state, the MSC/VLR 20 refers to a subscriber class included in the subscriber information downloaded from the HLR 30, and performs restriction control as follows. Referring to FIG. 11, for example, the MSC/VLR 20 restricts the outgoing transmission from the mobile terminal 1 of the subscriber A having the subscriber class of "general user". According to this restriction, when the mobile terminal 1 initiates an outgoing transmission (S21a), such an outgoing transmission is restricted by the MSC/VLR 10 (S22). Therefore, an incoming reception request signal is not transmitted to the HLR 30. Thus, the outgoing transmission is restricted.

On the other hand, the MSC/VLR 20 does not restrict the outgoing transmission from a mobile terminal 2 of a subscriber B having the subscriber class of "priority user". For this reason, when the mobile terminal 2 initiates the outgoing transmission (S21b), the MSC/VLR 10 permits the outgoing transmission (S22), an access of the incoming reception request signal to the HLR 30 is permitted (S23), and the outgoing transmission process continues.

In this manner, when the HLR 30 is in a congestion state, the outgoing transmissions from some mobile terminals are restricted, whereas the outgoing transmissions from the other mobile terminals are permitted, depending on the content of the subscriber class.

CITATION LIST

Non Patent Literature

NPL 1: NTT DoCoMo, Company Information, "Cellular Mobile Communication System—3. Location Registration" (online) (searched on Apr. 28, 2012), the Internet URL: http://www.nttdocomo.co.jp/corporate/technology/rd/tech/bn/cellular/03/index.html

SUMMARY OF INVENTION

Technical Problem

As described above, when the HLR is in a congestion state, the outgoing transmission from the mobile terminal is restricted or permitted depending on the content of the subscriber class. In contrast, the location registration signals from the mobile terminals have the largest access number to access the HLR. When the HLR is in a congestion state, the transmission to the HLR is uniformly restricted.

Referring to FIG. 12, for example, when the mobile terminal 1 of the subscriber A located in the first cell, which is the previously located cell, moves to the second cell, which is the newly located cell (S31), the mobile terminal 1 or 2 of the subscriber A or B, respectively, transmits the location registration signal (S32).

Upon receipt of the location registration signal transmitted from the mobile terminal 1 or 2, the MSC/VLR 10 corresponding to the newly located cell acquires the authentication information about the subscriber A from the MSC/VLR 20 corresponding to the previously located cell (S33). In this situation, since the HLR 30 is in a congestion state, an access to the HLR 30 is not available and the MSC/VLR 20 is not capable of downloading the subscriber information about the subscriber A or B from the HLR 30. Unless the MSC/VLR 20 can acquire the subscriber information, a service to be provided to the mobile terminal may not be provided.

For example, unless the subscriber class information included in the subscriber information can be acquired, the communications service cannot be provided to the mobile terminal set as "priority user" on a priority basis in reality, in spite of the "priority user". In other words, the outgoing transmission will be restricted regardless of the "general user" or the "priority user" of the subscriber class (S34).

The present invention has been made to solve the above problem of the related art, and provides a mobile communication control apparatus that can provide a mobile terminal with a communication service on a priority basis, when a priority class is set to the mobile terminal that moves from cell to cell and even if an HLR is in a congestion state, a mobile communication system, a mobile communication control method, and a mobile communication control program.

Solution to Problem

According to an aspect of the present invention, there is provided with a mobile communication control apparatus including: a signal reception unit (e.g., a signal reception unit 11 in FIG. 1) that receives an addressed signal transmitted from a mobile terminal that has moved to a movement destination area corresponding to the mobile communication control apparatus from a movement source area corresponding to another mobile communication control apparatus, the addressed signal being to be addressed to a home subscriber information management apparatus; a movement source identification unit that (e.g., a movement source identification unit 12 in FIG. 1), when the signal reception unit receives the addressed signal, identifies the another mobile communication control apparatus corresponding to the movement source area based upon a content of the addressed signal; an information acquisition unit (e.g., an information acquisition unit 13 in FIG. 1) that acquires, from the another mobile communication control apparatus identified by the movement source identification unit, priority class information (e.g., priority class information 130 in FIG. 1) indicating whether a transmission process of transmitting the addressed signal to the home subscriber information management apparatus is a priority process or a non-priority process; a determination unit (e.g., a determination unit 14 in FIG. 1) that determines whether or not the addressed signal is to be transmitted to the home subscriber information management apparatus based upon the priority class information acquired by the information acquisition unit; and a transmission unit (e.g., a transmission unit 15 in FIG. 1) that transmits to the home subscriber information management apparatus the addressed signal in accordance with a determination result of the determination unit. With the above configuration, when the mobile terminal that has moved from cell to cell is set as the priority class and even if the HLR is in a congestion state, it is possible to acquire the priority class information of the mobile terminal that has moved from cell to cell, so that the communication service can be provided to the mobile terminal on a priority basis.

In the above configuration, the signal reception unit may receive a location registration signal from the mobile terminal that has moved to the movement destination area corresponding to the mobile communication control apparatus from the movement source area corresponding to another mobile communication control apparatus, as the addressed signal, and the determination unit may determine whether or not the location registration signal is to be transmitted to the home subscriber information management apparatus based upon the priority class information acquired by the information acquisition unit. With the above configuration, when the mobile terminal that has moved from cell to cell is set as the priority class and even if the HLR is in a congestion state, it is possible to acquire the priority class information of the mobile terminal that has moved from cell to cell, so that the location registration signal from the mobile terminal can be transmitted to the HLR to provide the communication terminal to the mobile terminal on a priority basis.

In the above configuration, the priority class information acquired by the information acquisition unit may be predetermined for a user of the mobile terminal, and may indicate that a call process from the mobile terminal is performed with a priority higher than another call process from another mobile terminal. With the above configuration, the outgoing call process of the mobile terminal can be performed on a priority basis.

According to another aspect of the present invention, there is provided a mobile communication system including: the above mobile communication control apparatus (e.g., a mobile communication control apparatus 100 in FIG. 1); and the home subscriber information management apparatus, including: a congestion state detection unit (e.g., a congestion state detection unit 33 in FIG. 5) that detects a congestion state of the home subscriber information management apparatus; and a congestion process unit (e.g., a congestion process unit 34 in FIG. 5) that performs a predefined congestion process, when the congestion state detection unit detects the congestion state of the home subscriber information management apparatus, and the mobile communication control apparatus may transmit the addressed signal to the home subscriber information management apparatus. With the above configuration, the congestion process can be performed appropriately in accordance with the congestion state of the home subscriber information management apparatus.

In the above configuration, when the number of transactions performed by the home subscriber information management apparatus exceeds a predefined first threshold, the congestion state detection unit may detect that the home subscriber information management apparatus is in the congestion state, and when the congestion state detection unit detects that the home subscriber information management apparatus is in a first congestion state, the congestion process unit may discard the addressed signal received by the signal reception unit. With the above configuration, the congestion process can be performed appropriately in accordance with the congestion state of the home subscriber information management apparatus.

In addition, when the number of transactions performed by the home subscriber information management apparatus exceeds a predefined second threshold, the congestion state detection unit may detect that the home subscriber information management apparatus is in the congestion state, and when the congestion state detection unit detects that the home subscriber information management apparatus is in the second congestion state, the congestion process unit may transmit a transmission restriction instruction signal of giving an instruction of restricting the transmission of the addressed signal, to the mobile communication control apparatus that is a transmission source apparatus of the addressed signal. With the above configuration, the congestion process can be performed appropriately in accordance with the congestion state of the home subscriber information management apparatus.

According to yet another aspect of the present invention, there is provided a mobile communication control method comprising steps of: receiving an addressed signal transmitted from a mobile terminal that has moved to a movement destination area corresponding to a mobile communication control apparatus from a movement source area corresponding to another mobile communication control apparatus, the addressed signal being to be addressed to a home subscriber information management apparatus; identifying, when the addressed signal is received by the receiving step, the another mobile communication control apparatus corresponding to the movement source area based upon a content of the addressed signal; acquiring, from the another mobile communication control apparatus identified by the identifying step, priority class information indicating whether a transmission process of transmitting the addressed signal to the home subscriber information management apparatus is a priority process or a non-priority process; determining whether or not the addressed signal is to be transmitted to the home subscriber information management apparatus based upon the priority class information acquired by the acquiring step; and transmitting to the home subscriber information management apparatus the addressed signal in accordance with a determination result of the determining step. With the above configuration, when the mobile terminal that has moved from cell to cell is set as the priority class and even if the HLR is in a congestion state, it is possible to acquire the priority class information of the mobile terminal that has moved from cell to cell, so that the communication service can be provided to the mobile terminal on a priority basis.

According to still another aspect of the present invention, there is provided a mobile communication control program causing a computer to perform steps of: receiving an addressed signal transmitted from a mobile terminal that has moved to a movement destination area corresponding to a mobile communication control apparatus from a movement source area corresponding to another mobile communication control apparatus, the addressed signal being to be addressed to a home subscriber information management apparatus; identifying, when the addressed signal is received by the receiving step, the another mobile communication control apparatus corresponding to the movement source area based upon a content of the addressed signal; acquiring, from the another mobile communication control apparatus identified by the identifying step, priority class information indicating whether a transmission process of transmitting the addressed signal to the home subscriber information management apparatus is a priority process or a non-priority process; determining whether or not the addressed signal is to be transmitted to the home subscriber information management apparatus based upon the priority class information acquired by the acquiring step; and transmitting to the home subscriber information management apparatus the addressed signal in accordance with a determination result of the determining step. With the above configuration, when the mobile terminal that has moved from cell to cell is set as the priority class and even if the HLR is in a congestion state, it is possible to acquire the priority class information of the mobile terminal that has moved from cell to cell, so that the communication service can be provided to the mobile terminal on a priority basis.

Advantageous Effects of Invention

According to the present invention, when the priority class is set to the mobile terminal that has moved from cell to cell and even if the HLR is in a congestion state, the priority class information of the mobile terminal can be acquired. It is therefore possible to provide the mobile terminal with the communication service on a priority basis.

BRIEF DESCRIPTION OF DRAWINGS

FIG. 7 is a view illustrative of another example of the congestion process;

FIG. 12 is a view illustrative of a possibility of not capable of providing the service to be provided to the mobile terminal, in a congestion state.

DESCRIPTION OF EMBODIMENTS

Figure 1:
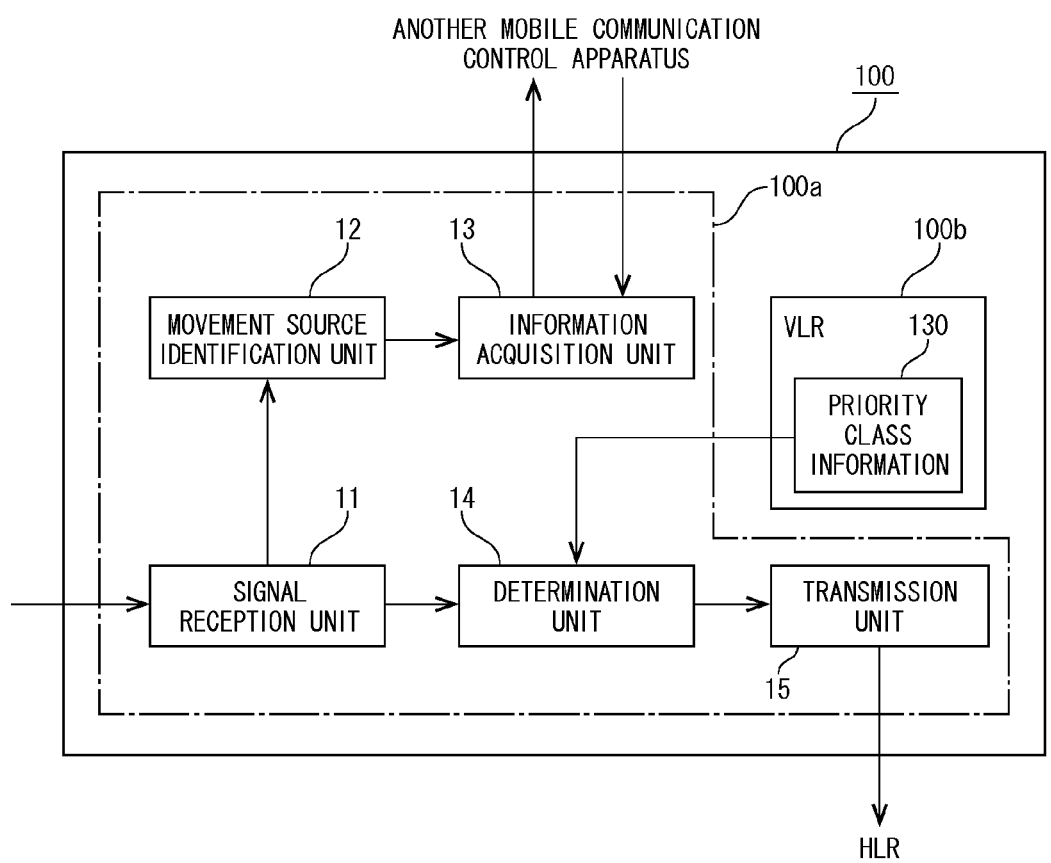
FIG. 1 is a block diagram illustrative of a configuration example of a mobile communication control apparatus according to an embodiment of the present invention.

Hereinafter, embodiments of the present invention will be described with reference to the drawings. In each of the drawings to be referred to in the following description, the same components and configurations are indicated by the same reference numerals.

(Configuration Example of Mobile Communication Control Apparatus)

FIG. 1 is a block diagram illustrative of a configuration example of a mobile communication control apparatus according to an embodiment of the present invention. Referring to FIG. 1, a mobile communication control apparatus 100 according to the present embodiment includes a Mobile Switching Center (MSC) 100*a* as a switching center, and a Visitor Location Register (VLR) 100*b* as a visitor location register.

As illustrated in FIG. 1, the mobile communication control apparatus 100 encompasses a signal reception unit 11, a movement source identification unit 12, an information acquisition unit 13, a determination unit 14, and a transmission unit 15.

The signal reception unit 11 receives signals transmitted from mobile terminals and the like. The signals transmitted from the mobile terminals and the like include a location registration signal, which is a signal addressed to a management apparatus to be transmitted to an HLR that is a home subscriber information management apparatus.

The movement source identification unit 12 identifies another mobile communication control apparatus corresponding to a cell where a mobile terminal is previously located before movement. The movement source identification unit 12 identifies the mobile communication control apparatus corresponding to the cell where a mobile terminal is previously located before movement, hereinafter, referred to as "the movement source cell of the mobile terminal", based upon a content of the location registration signal received by the signal reception unit 11. The location registration signal transmitted from the mobile terminal includes a Location Area Identification (LAI), and by analyzing the content of the LAI, the mobile communication control apparatus corresponding to the movement source cell of the mobile terminal can be identified.

The information acquisition unit 13 acquires authentication information about the mobile terminal from another mobile communication control apparatus, not illustrated, identified by the movement source identification unit 12. In the present example, the authentication information acquired by the information acquisition unit 13 includes information about the subscriber class. That is, the information acquisition unit 13 is capable of acquiring priority class information indicative of to which "priority user" or "general user" the subscriber class of the subscriber of the mobile terminal belongs.

In such a situation, the above-described another mobile communication control apparatus, not illustrated, identified by the movement source identification unit 12 holds the priority class information. Then, upon receipt of a request signal transmitted from the information acquisition unit 13, the above-described another mobile communication control apparatus, not illustrated, replies the authentication information including the priority class information as a reply signal. The information acquisition unit 13 is capable of acquiring the priority class information by receiving the replay signal. As to the replay signal, only when the subscriber class belongs to "priority user", a flag indicative of the "priority user" may be set to ON or identification information indicative of the "priority user" may be transmitted (the transmission is made only when the subscriber class belongs to "priority user"), so that the information acquisition unit 13 can acquire the priority class information. In addition, priority class information 130 acquired by the information acquisition unit 13 may be stored in the VLR 100b, for example.

The determination unit 14 determines whether or not the location registration signal should be transmitted to the HLR based upon the content of the priority class information 130. The transmission unit 15 transmits the location registration signal to the HLR according to the determination result of the determination unit 14.

When the HLR is not in a congestion state, the location registration signal is transmitted to the HLR by the determination unit 14 and the transmission unit 15 regardless of the content of the priority class information 130. Conversely, when the HLR is in a congestion state and the priority class information 130 is the "general user", the location registration signal is not transmitted to the HLR. In the above case, for example, the location registration signal may be discarded. On the other hand, when the HLR is in a congestion state and the priority class information 130 is the "priority user", the location registration signal is transmitted to the HLR by the determination unit 14 and the transmission unit 15. That is to say, even if the HLR that is a transmission destination is in a congestion state, the location registration signal from the "priority user" is transmitted.

It is to be noted that the respective components of FIG. 1 can be realized by a CPU, not illustrated, performing pre-defined programs.

(Operation Example of Mobile Communication Control Apparatus)

Figure 2:
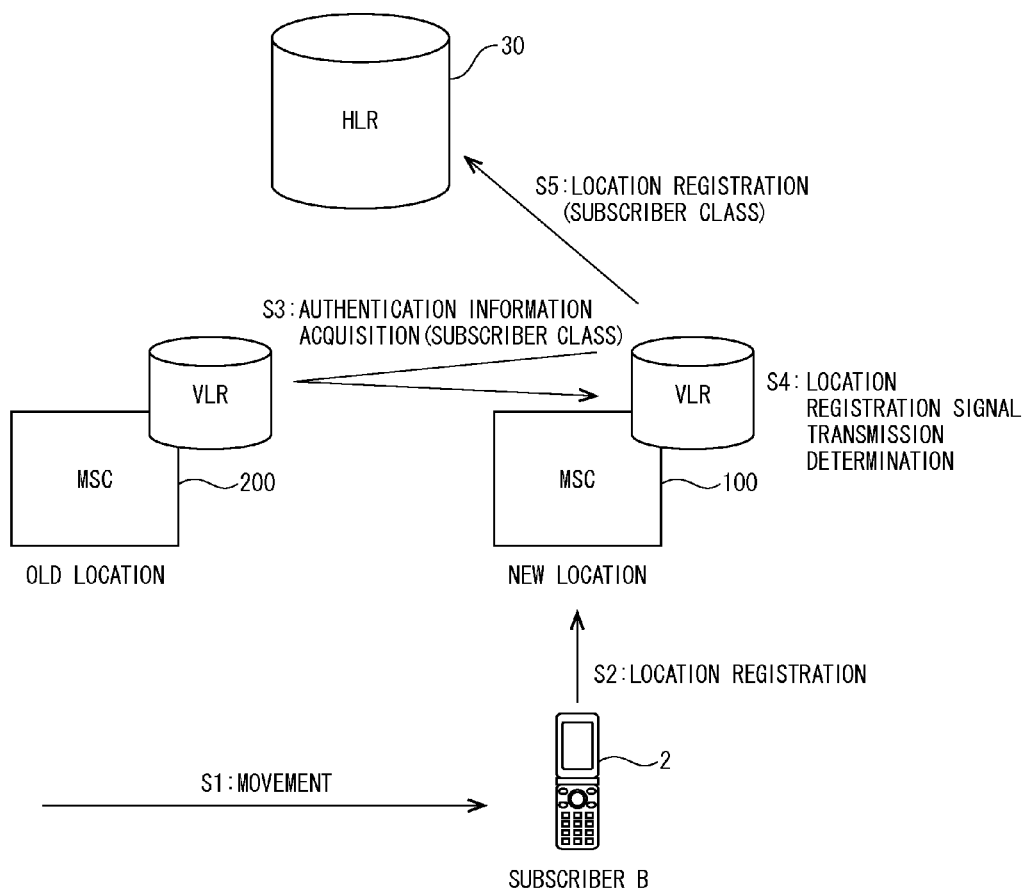
FIG. 2 is a view illustrative of an operation example of the mobile communication control apparatus according to the present embodiment.

Next, an operation example of the mobile communication control apparatus according to the present embodiment will be described with reference to FIG. 2. As illustrated in FIG. 2, when the mobile terminal 2 of the subscriber B located in a first cell, which is the previously located cell, moves to a second cell, which is the newly located cell (S1), the mobile terminal 2 of the subscriber B transmits the location registration signal (S2).

Upon receipt of the location registration signal transmitted from the mobile terminal 1 or 2, the mobile communication control apparatus 100, which is the MSC/VLR corresponding to the newly located cell, identifies an MSC/VLR 200 corresponding to the previously located cell as described above, and acquires the authentication information about the subscriber B from the MSC/VLR 200 (S3). Then, the MSC/VLR 100 performs the authentication process. In addition, according to the present example, the authentication information includes the information about the subscriber class, and therefore the MSC/VLR 100 is capable of acquiring the priority class information indicative of to which the "priority user" or the "general user" the subscriber class of the subscriber B of the mobile terminal 2 belongs.

In the present example, since the subscriber class of the subscriber B of the mobile terminal 2 is the "priority class", the determination result of the determination unit 14 has the content of transmitting the location registration signal to the HLR (S4). Accordingly, the location registration signal transmitted from the mobile terminal 2 of the subscriber B having the subscriber class "priority user" is transmitted to the HLR 30 (S5).

In this manner, as to the location registration signal transmitted from the mobile terminal of the subscriber having the subscriber class "priority user", the location registration signal is transmitted, even if the HLR, which is a transmission destination, is in a congestion state.

(Signal Transmission and Reception Between Respective Apparatuses)

Figure 3:
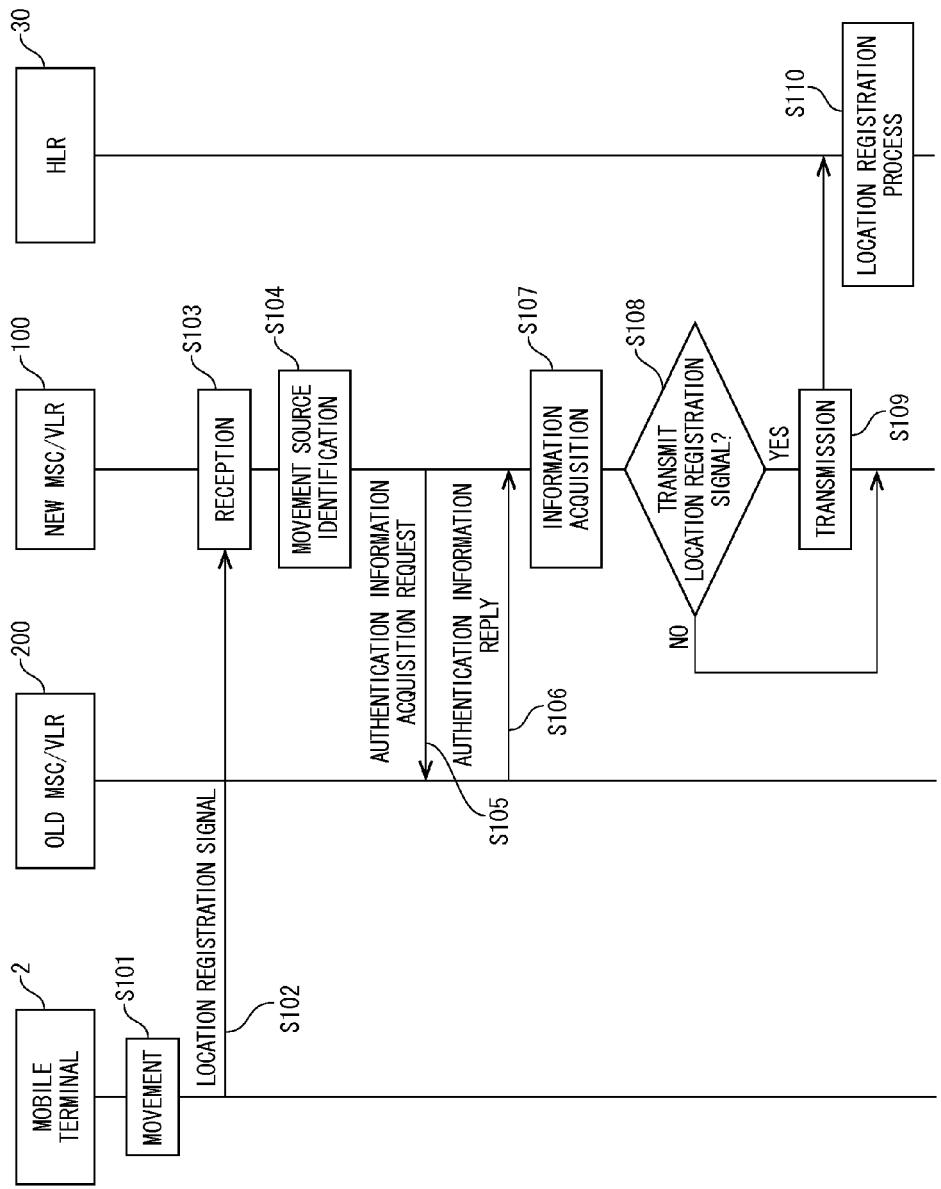
FIG. 3 is a sequence diagram illustrative of signal transmission and reception between respective apparatuses of FIG. 2.

FIG. 3 is a sequence diagram illustrative of signal transmission and reception between respective apparatuses of FIG. 2. Referring to FIG. 3, a "new MSC/VLR" indicates the mobile communication control apparatus 100 corresponding to the cell where the mobile terminal is located after movement, and an "old MSC/VLR" indicates the mobile communication control apparatus 200 corresponding to the cell where the mobile terminal was located before movement, respectively.

As illustrated in FIG. 3, when the mobile terminal 2 located in the cell corresponding to the mobile communication control apparatus (old MSC/VLR) 200 moves to the cell corresponding to the mobile communication control apparatus (new MSC/VLR) 100 (S101), the mobile terminal 2 transmits the location registration signal (S102).

When the mobile communication control apparatus (new MSC/VLR) 100 receives the location registration signal transmitted from the mobile terminal 2 (S103), the mobile communication control apparatus (new MSC/VLR) 100 identifies the mobile communication control apparatus (old MSC/VLR) 200 corresponding to the movement source cell of the mobile terminal 2 (S104). The mobile communication control apparatus (new MSC/VLR) 100 transmits an authentication information acquisition request signal to the mobile communication control apparatus (old MSC/VLR) 200 that has been identified. The mobile communication control apparatus (old MSC/VLR) 200 that has received the authentication information acquisition request signal replies an authentication information reply signal (S106).

Upon receipt of the authentication information reply signal from the mobile communication control apparatus (old MSC/VLR) 200, the mobile communication control apparatus (new MSC/VLR) 100 performs the authentication process. In addition, since the authentication information reply signal includes the priority class information, which is the information about the subscriber class of the mobile terminal 2, the mobile communication control apparatus (new MSC/VLR) 100 is capable of acquiring the information about the subscriber class of the mobile terminal 2 (S107).

The mobile communication control apparatus (new MSC/VLR) 100 determines whether or not the location registration signal transmitted from the mobile terminal 2 should be transmitted to the HLR 30 based upon the priority class information, which is the information about the subscriber class of the mobile terminal 2 (S108). When the HLR 30 is in a congestion state and the subscriber class of the mobile terminal 2 is the "priority user", the transmission of the location registration signal to the HLR is determined.

When the transmission of the location registration signal to the HLR 30 is determined (S108: YES), the mobile communication control apparatus (new MSC/VLR) 100 transmits the location registration signal transmitted from the mobile terminal 2 to the HLR 30 (S109). The HLR 30 that has received the location registration signal performs a location registration process (S110).

On the other hand, when the HLR 30 is in a congestion state and the subscriber class of the mobile terminal 2 is the "general user", the location registration signal transmitted from the mobile terminal 2 is determined not to be transmitted to the HLR 30 (S108: NO). As a result of the above determination, the location registration signal transmitted from the mobile terminal 2 may be discarded, for example.

(Setting Example of Subscriber Class to Signal to be Transmitted to HLR)

A description will now be given of a setting example of the subscriber class to the signal to be transmitted to the HLR. As to the setting of the subscriber class to the signal to be transmitted to the HLR from the mobile communication control apparatus (MSC/VLR), the setting may be determined in consideration of not only the subscriber class information of the user but also the system type (e.g. systems or networks relating to satellite telephones are set to priority systems or priority networks) and the signal type (e.g. signals used for services such as message boards at the time of disaster).

Figure 4:
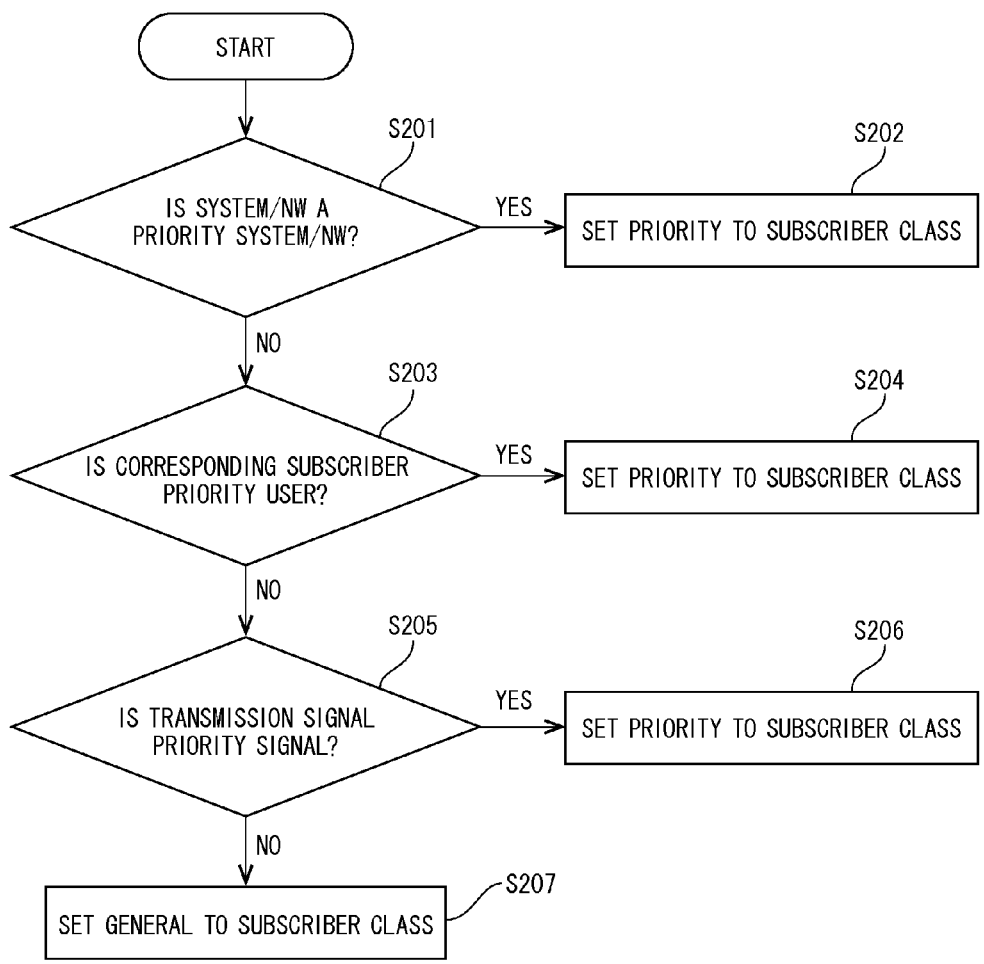
FIG. 4 is a flowchart illustrative of setting examples and determination examples of a subscriber class.

The above determination example will be described with reference to FIG. 4. As illustrated in FIG. 4, firstly, whether or not a system or a network (i.e., NW) of the transmission source is the system or network to which the priority should be given is determined (S201). As a result of the determination, when determined is the system or network to which the priority should be given (S201: YES), "priority" is set to the subscriber class (S202).

As a result of the determination at step S201, when it is not the system or network to which the priority should be given (S201: NO), whether or not the subscriber is the priority user is determined next (S203). As a result of the above determination, when the subscriber is the priority user (S203: YES), the "priority" is set to the subscriber class (S204).

As a result of the determination at step S203, when the user is not the "priority" user (S203: NO), whether or not the transmission signal should be transmitted with a priority higher than other transmission signals is determined next (S205). As a result of the above determination, when the signal should be transmitted with a priority (S205: YES), the "priority" is set to the subscriber class (S206).

As a result of the determination at step S205, when the signal should not be transmitted with a priority (S205: NO), the "general" is set to the subscriber class (S207).

By setting the subscriber class as described above, not only the signals transmitted from the priority users can be processed on a priority basis but also, for example, the transmission signals from the systems or the networks relating to the satellite telephones can be processed on a priority basis or the signals used for services to be activated at the time of disaster can be processed on a priority basis, for example.

The subscriber class settings are not limited to the signals transmitted to the HLR from the mobile communication control apparatus (MSC/VLR), but may be set in another apparatus that transmits signals to the HLR, as described above. In addition to the subscriber class settings, the above determinations may be applied to a signal transmission restriction to the HLR. The restriction control can be achieved depending on not only the subscriber class information of users but also the system types or the signal types, when the HLR is in a congestion state.

(Example of Acquisition Control of Subscriber Class)

In acquisition control of the subscriber class from the mobile communication control apparatus (MSC/VLR) corresponding to the previously located cell, the following processes may be performed.

(1) At the time of location registration, when International Mobile User Identity (IMUI), not Temporary Mobile User Identity (TMUI), is set as a user ID set in the location registration signal to be transmitted to the mobile communication control apparatus (MSC/VLR) from the mobile terminal, the subscriber class is treated as the priority class.

(2) At the time of location registration, when home network area information is not set as area information of the switching center corresponding to the previously located cell set to the location registration signal to be transmitted to the mobile communication control apparatus (MSC/VLR) from the mobile terminal, the subscriber class is treated as the priority class.

(3) When the subscriber class is not set to the signal to the mobile communication control apparatus (new MSC/VLR) corresponding to the newly located cell from the mobile communication control apparatus (old MSC/VLR) corresponding to the previously located cell, the subscriber class is treated as the priority class.

(4) The acquisition control of the subscriber class from the mobile communication control apparatus (old MSC/VLR) corresponding to the previously located cell to the mobile communication control apparatus (new MSC/VLR) corresponding to the newly located cell, and the subscriber class setting to the location registration signal to the HLR from the mobile communication control apparatus (new MSC/VLR) may be performed in a normal state, instead of the congestion state. A first step of congestion control at the HLR, as will be described later, can be achieved.

(Configuration Example of Home Subscriber Information Management Apparatus)

Figure 5:
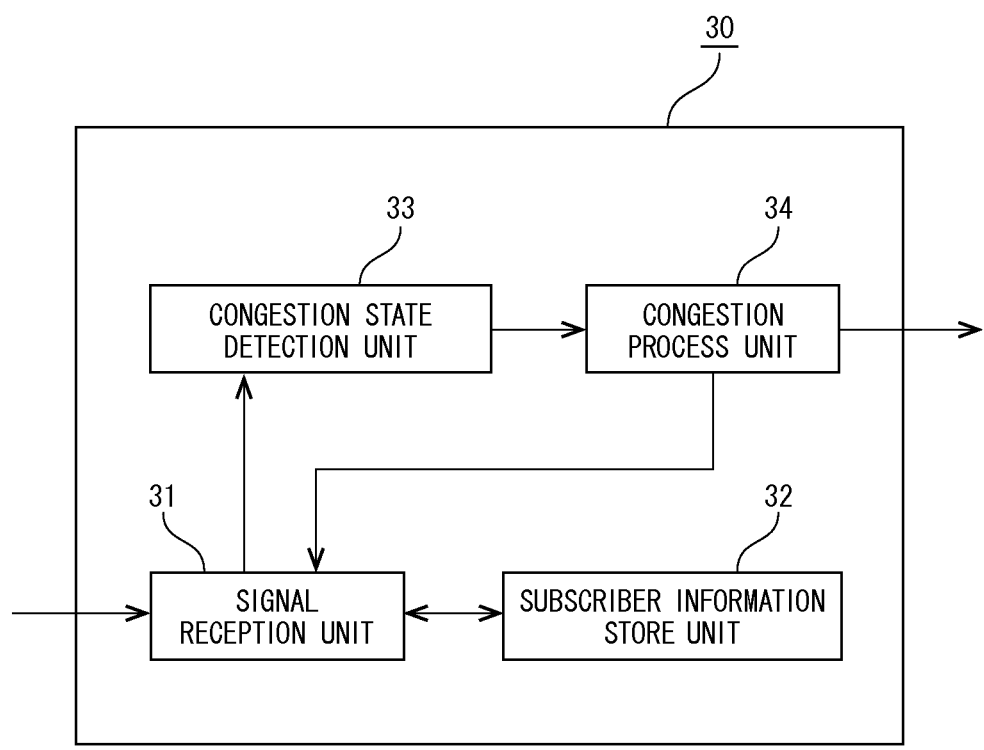
FIG. 5 is a block diagram illustrative of a configuration example of a home subscriber information management apparatus.

Next, a description will be given of a configuration example of a home subscriber information management apparatus according to the present embodiment. FIG. 5 is a block diagram illustrative of a configuration example of the home subscriber information management apparatus according to the present embodiment. As illustrated in FIG. 5, the home subscriber information management apparatus (HLR) 30 according to the present embodiment encompasses a signal reception unit 31, a subscriber information store unit 32, a congestion state detection unit 33, and a congestion process unit 34.

The signal reception unit 31 receives various signals, in addition to the location registration signals transmitted from the mobile communication control apparatus (MSC/VLR).

The subscriber information store unit 32 stores the subscriber information. For example, when the signal reception unit 31 receives the location registration signal transmitted from the mobile terminal, the location registration process may be performed and the location information of the mobile terminal is stored in the subscriber information store unit 32.

The congestion state detection unit 33 detects the congestion in the home subscriber information management apparatus 30 itself and the congestion in the transmission path to reach the home subscriber information management apparatus 30. The congestion state detection unit 33 may detect the congestion state by a comparison with a predefined threshold, for example.

The congestion process unit 34 performs a congestion process when the congestion state detection unit 33 detects the congestion state. The congestion process may include, for example, a process of discarding signals, a process of transmitting a control signal such as transmission restriction, etc. to another apparatus.

It is to be noted, however, that the respective components of FIG. 1 can be realized by a CPU, not illustrated, performing predefined programs.

(Congestion Threshold)

The congestion state detection unit 33 of the HLR 30 may hold plural types of the thresholds to be used for congestion detection. For example, the congestion state detection unit 33 may hold two steps of the congestions thresholds.

An example of the congestion process in a case where the congestion state detection unit 33 holds a first threshold and a second threshold will be described with reference to FIG. 6 and FIG. 7.

Figure 6:
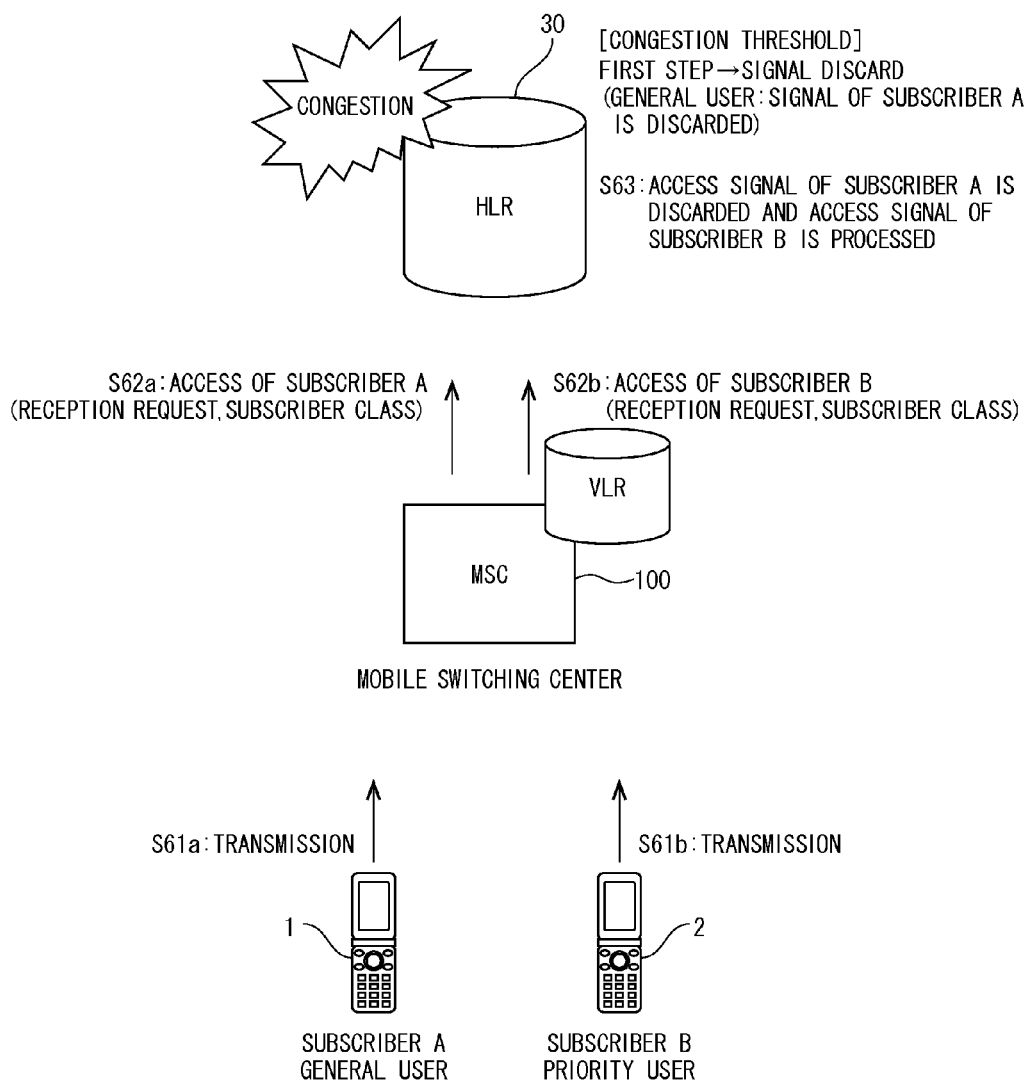
FIG. 6 is a view illustrative of an example of a congestion process.

As illustrated in FIG. 6, when the mobile terminal 1 of the subscriber A having the subscriber class "general user" transmits a signal (S61a), the mobile communication control apparatus 100 transmits an access signal of the subscriber A including the incoming reception request and the information about the subscriber class "general user" (S62a). In addition, when the mobile terminal 2 of the subscriber B having the subscriber class "priority user" transmits a signal (S61b), the mobile communication control apparatus 100 transmits an access signal of the subscriber B including the incoming reception request and the information about the subscriber class "priority user" (S62b).

The HLR 30 determines whether or not the number of signals that the HLR 30 has received exceeds the first step of congestion threshold (first threshold). When the number of received signals exceeds the first step of congestion threshold, the congestion state detection unit 33 detects the threshold excess and gives an instruction corresponding to the first threshold to the congestion process unit 34. The congestion process unit 34 discards the access signal from the mobile terminal 1 of the subscriber A including the incoming reception request and the information of the subscriber class "general user" (S63). In addition, the congestion process unit 34 processes (does not discard) the access signal, which includes the incoming reception request and the information about the subscriber class "priority user", and which is transmitted from the mobile terminal 2 of the subscriber B.

Then, when the number of signals that the HLR 30 has received exceeds a second step of congestion threshold (second threshold), the congestion state detection unit 33 detects the threshold excess and gives an instruction corresponding to the second threshold to the congestion process unit 34. The first step of the congestion process that has been described with reference to FIG. 6 is discarding of the signal (i.e., the access signal of the subscriber class "general user" is discarded), whereas the second step of the congestion process is a restriction instruction in the present example, as illustrated in FIG. 7 (S71). That is to say, when the number of received signals exceeds the second step of congestion threshold, the congestion state detection unit 33 detects the threshold excess and gives an instruction corresponding to the second threshold to the congestion process unit 34. The congestion process unit 34 that has received the above instruction gives a restriction instruction to the mobile communication control apparatus 100.

The mobile communication control apparatus 100 that has received the restriction instruction restricts the transmission of the access signal of the subscriber class "general user", but permits the access signal of the subscriber class "priority user". Specifically, when the mobile terminal 1 of the subscriber A having the subscriber class "general user" initiates an outgoing transmission (S73a) and the mobile terminal 2 of the subscriber B having the subscriber class "priority user" initiates an outgoing transmission (S73b), the mobile communication control apparatus 100 refers to the subscriber class and restricts the outgoing transmission from the mobile terminal 1 of the subscriber A having the subscriber class "general user" (S74). In addition, the mobile communication control apparatus 100 refers to the subscriber class and permits the outgoing transmission from the mobile terminal 2 of the subscriber B having the subscriber class "priority user" (S74). Accordingly, the mobile communication control apparatus 100 transmits to the HLR 30 the access signal from the mobile terminal 2 of the subscriber B including the incoming reception signal and the information about the subscriber class "priority user" (S75).

(Specific Example of Congestion Threshold)

Figure 8:
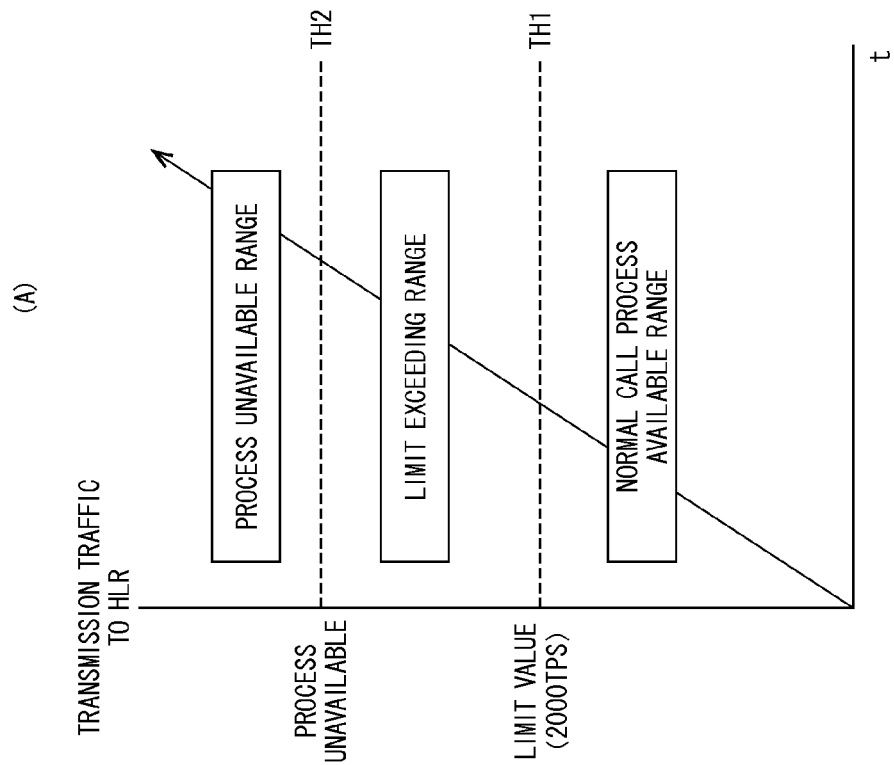
FIG. 8A is a view illustrative of a specific example of a congestion threshold in a case where the traffic changes in accordance with the lapse of time.
FIG. 8B is a view illustrative of a process content corresponding to each range of the threshold.

Next, specific examples of the congestion thresholds will be described with reference to FIG. 8A and FIG. 8B. FIG. 8A is a view illustrative of an example in a case where the transmission traffic to the HLR changes in accordance with the lapse of time t.

The first threshold TH1 in FIG. 8A and FIG. 8B is a threshold for discarding the signals of outgoing transmission/incoming reception and the location registration of the general subscribers, in other words, the first threshold TH1 is a limit value for performing a normal process. In the present example, the transmission traffic value to HLR=2,000 TPS (Transactions Per Second) is a limit value for performing the normal process. Accordingly, if the number of transactions of the transmission traffic value to HLR exceeds 2,000 TPS (Transactions Per Second), the normal process will not be performed.

In addition, the second threshold TH2 in FIG. 8A and FIG. 8B is a threshold for reaching a process unavailable range. Therefore, the range equal to or smaller than the first threshold TH1 is a normal call process available range, the range larger than the first threshold TH1 and equal to or smaller than the second threshold TH2 is a limit exceeding range, and the range exceeding the second threshold TH2 is a process unavailable range.

FIG. 8B is a view illustrative of a process content corresponding to each range of the threshold.

When the transmission traffic to HLR (i.e., the number of the signals received by the HLR) is equal to or smaller than the first threshold TH1 (<=TH1), the transmission traffic is equal to or lower than the limit value. Hence, a general call from the subscriber class "general user" and a priority call from the subscriber class "priority user" are processed in the same manner.

On the other hand, when the transmission traffic to HLR (i.e., the number of the signals received by the HLR) is greater than the first threshold TH1 (>TH1) and equal to or smaller than the second threshold TH2 (<=TH2), the transmission traffic exceeds the limit value and is smaller than the process unavailable range. Accordingly, in the present example, signals for the outgoing transmission/incoming reception and the location registration signals from the general subscribers, exceeding 2,000 TPS, are discarded. The first congestion state occurs as described above.

The signals exceeding 2,000 TPS are discarded. However, for example, when the signals of 2,300 TPS are received, the restriction signal may be transmitted to a related apparatus from the HLR so that related apparatus can restrict the signals from the general subscribers. The second congestion state occurs as described above.

Further, when the transmission traffic to HLR (i.e., the number of the signals received by the HLR) is greater than the second threshold TH2 (>TH2), the HLR is not capable of performing the signal discarding process, falls into a congestion state, and is not capable of processing the signals.

As described above, when the number of signals received by the HLR exceeds the first step of congestion threshold, for example, the signals may be discarded in the HLR. The signal discarding process may be performed by, for example, discarding the signals from the general users of the subscriber class, but not discarding the signals from the priority users of the subscriber class. Furthermore, the threshold values in the first and second steps may vary, instead of constant values.

In addition, if the number of signals received by the HLR exceeds the second step of congestion threshold, the HLR transmits a restriction instruction signal to the mobile communication control apparatus, and the mobile communication control apparatus performs the signal restriction to the HLR in accordance with the instruction from the HLR. The signal restriction may be performed by, for example, restricting the signals from the general users of the subscriber class, but not restricting the signals from the priority users of the subscriber class. The HLR may add a parameter to the restriction instruction signal transmitted to the mobile communication control apparatus, so that the added parameter can be used for instructing what percentage of the signals from the general users of the subscriber class should be restricted. Further, the added parameter may be used for instructing what percentage of the signals from the priority users of the subscriber class should be restricted.

Figure 9:
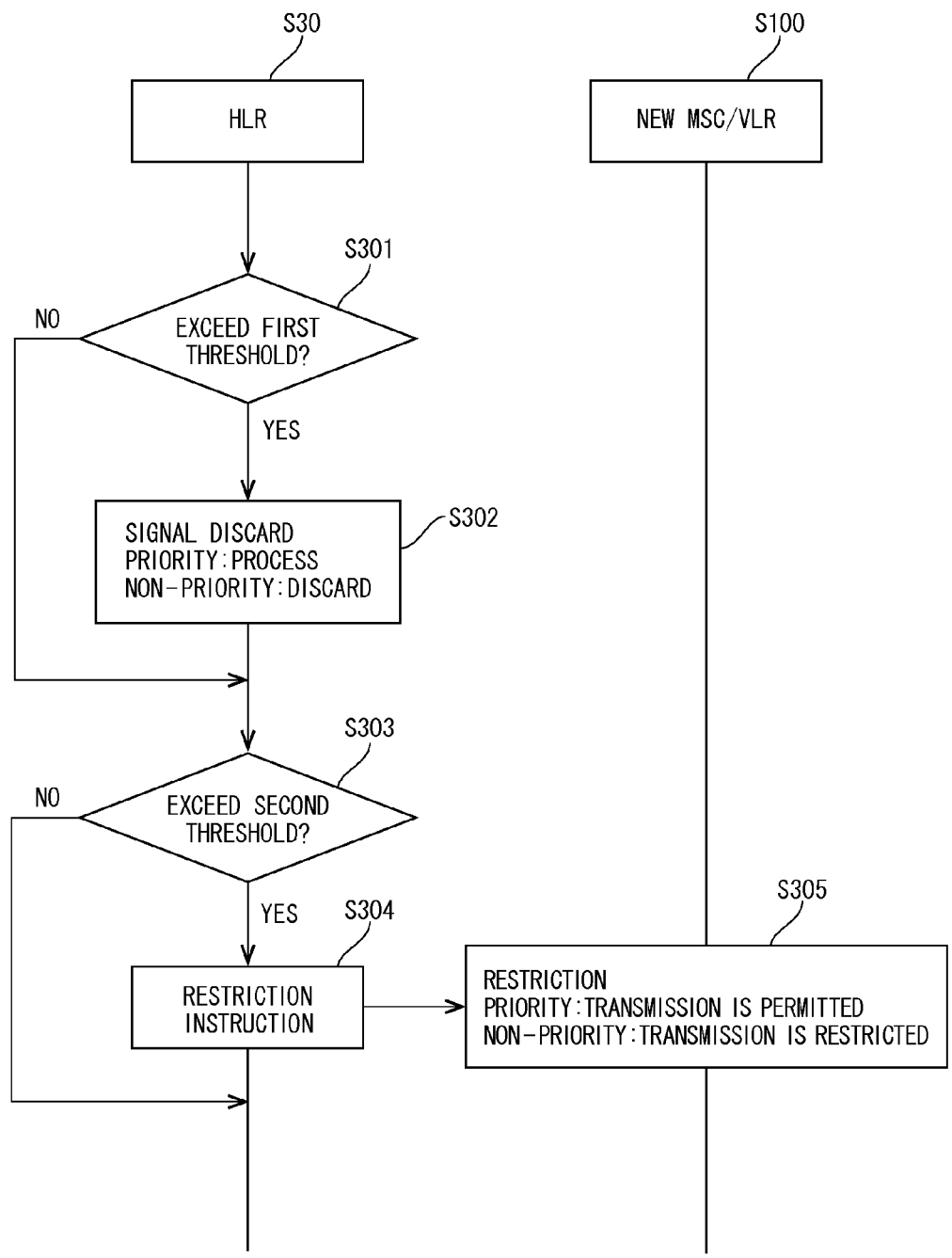
FIG. 9 is a sequence chart illustrative of the congestion process by use of a first threshold and a second threshold.
Figure 10:
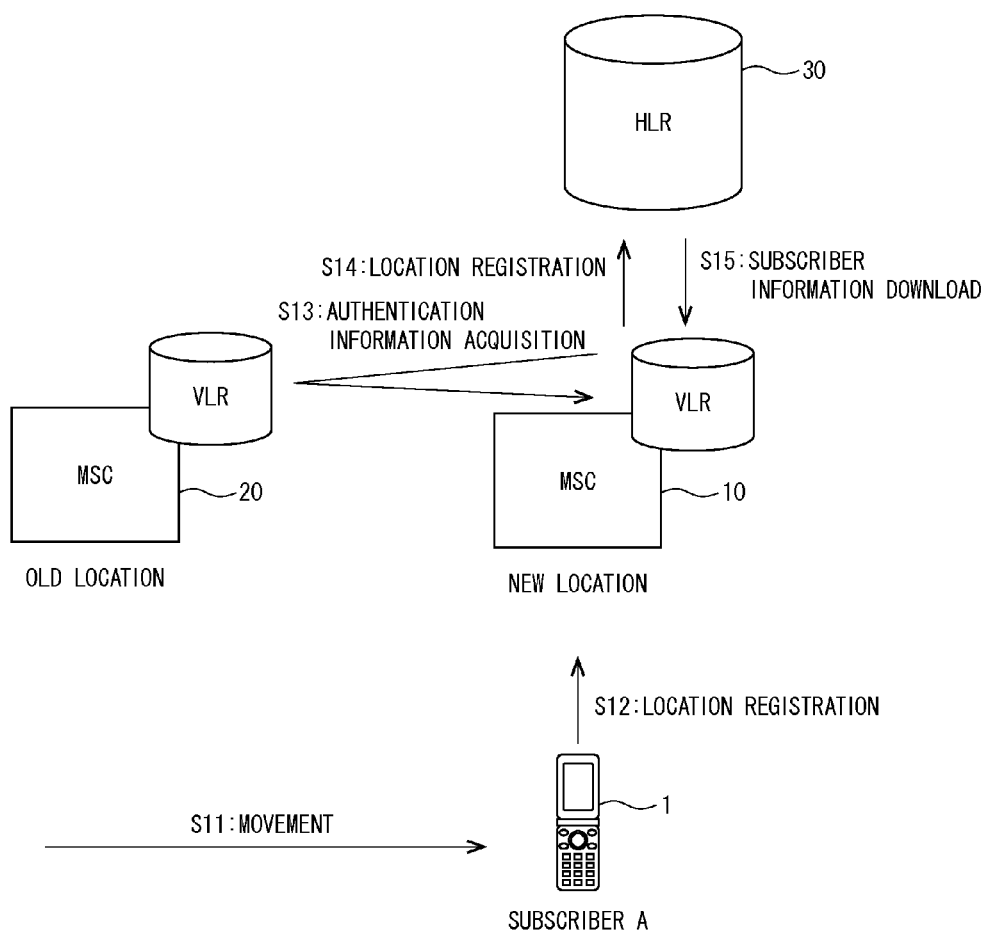
FIG. 10 is a view illustrative of an example in a case of location registration.
Figure 11:
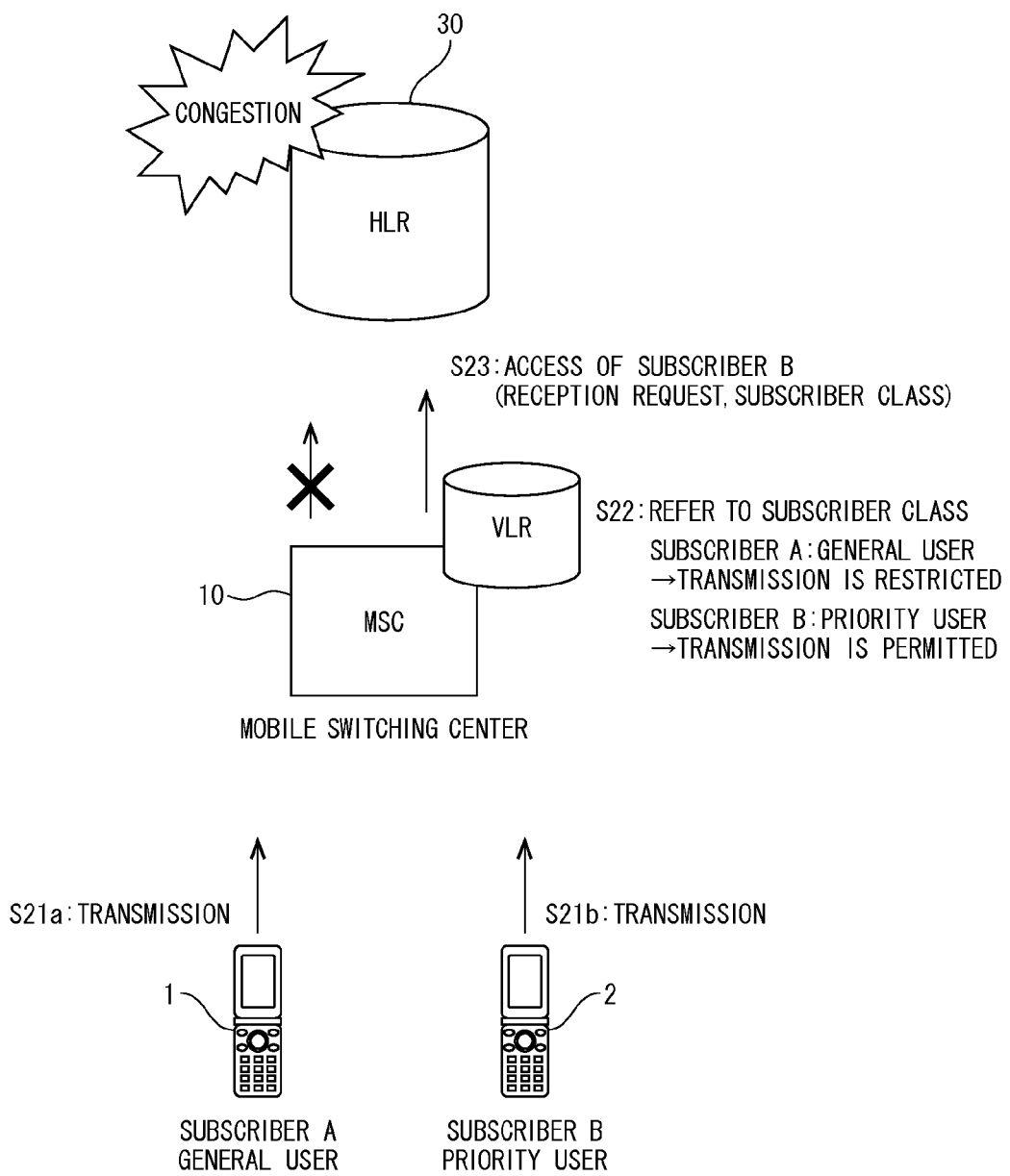
FIG. 11 is a view illustrative of an example in a case of restricting an outgoing transmission.

The congestion process by use of the above-described first and second thresholds will be further described with reference to FIG. 9. Referring to FIG. 9, firstly, when the number of signals received by the HLR 30 is greater than the first threshold (the first congestion state), the congestion process for discarding the signals is performed at the HLR (S301: YES), (S302). The congestion process of discarding the signals at the HLR 30 may be performed by, for example, normally processing the signals from the priority users of the subscriber class without discarding the signals, but discarding the signals from the general users (i.e., non-priority users) of the subscriber class. That is, the congestion process may be performed so that the signals from the priority users should not be discarded.

Moreover, when the number of signals received by the HLR 30 is greater than the second threshold (the second congestion state), the HLR 30 transmits the restriction instruction signal to the mobile communication control apparatus 100 (S301: NO, S303: YES), (S304). The mobile communication control apparatus 100 that has received the restriction instruction signal performs the restriction process. The restriction process at the mobile communication control apparatus 100 may be performed by, for example, normally permitting the outgoing transmissions from the mobile terminals corresponding to the priority users of subscriber class without a restriction, but restricting the outgoing transmissions from the mobile terminals corresponding to the general users (i.e., non-priority users) of subscriber class.

By providing the two steps of thresholds in the above-described manner, two steps of processes including the discard control and restriction control can be performed depending on the degree of the congestion state. Accordingly, in the mobile communication service having a precondition of providing services continuously, the signal process can be performed up to the processing performance limit and the apparatus can be protected by the apparatus itself.

(Mobile Communication Control Method)

In the above-described mobile communication control apparatus, a mobile communication control method is performed as will be described as follows. That is, the mobile communication control method includes: receiving an addressed signal transmitted from a mobile terminal that has moved to a movement destination area corresponding to a mobile communication control apparatus from a movement source area corresponding to another mobile communication control apparatus, the addressed signal being to be addressed to a home subscriber information management apparatus; identifying, when the addressed signal is received by the receiving step, the another mobile communication control apparatus corresponding to the movement source area based upon a content of the addressed signal; acquiring, from the another mobile communication control apparatus identified by the identifying step, priority class information indicating whether a transmission process of transmitting the addressed signal to the home subscriber information management apparatus is a priority process or a non-priority process; determining whether or not the addressed signal is to be transmitted to the home subscriber information management apparatus based upon the priority class information acquired by the acquiring step; and transmitting to the home subscriber information management apparatus the addressed signal in accordance with a determination result of the determining step. With use of the above method, when the mobile terminal that has moved from cell to cell is set as the priority class and even if the HLR is in a congestion state, it is possible to acquire the priority class information of the mobile terminal that has moved from cell to cell, so that the communication service can be provided to the mobile terminal on a priority basis.

(Mobile Communication Control Program)

In the above-described mobile communication control apparatus, a mobile communication control program is performed as will be described as follows. That is, the mobile communication control program for controlling the mobile communication control apparatus, and for causing a computer to perform steps: receiving an addressed signal transmitted from a mobile terminal that has moved to a movement destination area corresponding to a mobile communication control apparatus from a movement source area corresponding to another mobile communication control apparatus, the addressed signal being to be addressed to a home subscriber information management apparatus; identifying, when the addressed signal is received by the receiving step, the another mobile communication control apparatus corresponding to the movement source area based upon a content of the addressed signal; acquiring, from the another mobile communication control apparatus identified by the identifying step, priority class information indicating whether a transmission process of transmitting the addressed signal to the home subscriber information management apparatus is a priority process or a non-priority process; determining whether or not the addressed signal is to be transmitted to the home subscriber information management apparatus based upon the priority class information acquired by the acquiring step; and transmitting to the home subscriber information management apparatus the addressed signal in accordance with a determination result of the determining step. With use of the above method, when the mobile terminal that has moved from cell to cell is set as the priority class and even if the HLR is in a congestion state, it is possible to acquire the priority class information of the mobile terminal that has moved from cell to cell, so that the communication service can be provided to the mobile terminal on a priority basis.

CONCLUSION

As described heretofore, a mobile communication control apparatus corresponding to the movement source cell of the mobile terminal is identified, so that the information about the subscriber class of the mobile terminal can be acquired from the identified apparatus. By acquiring the information indicating to which the "priority user" or the "general user" the subscriber class of the subscriber of the mobile terminal belongs, when the priority class is set to the mobile terminal that has moved from cell to cell and even if the HLR is in a congestion state, the signals from the mobile terminal are not restricted and the communication service can be provided to the mobile terminal on a priority basis. That is to say, by acquiring the subscriber class information, and determining the transmission permission/restriction of the location registration signal to the HLR or setting the subscriber class information to the location registration signal, the restriction control can be achieved for each system, each supplementary service, or each subscriber class at the time of congestion at the HLR.

It is to be noted that the scope of the present invention is not limited to the embodiments illustrated and described, but includes all embodiments that can bring the equivalent advantageous effects aimed by the present invention. Furthermore, the scope of the present invention is not limited to the combinations of the features of the present invention defined by the claims, but can be defined by specific and desired combinations of each of the features disclosed herein.

REFERENCE SIGNS LIST 1, 2 mobile terminal
11, 31 signal reception unit
12 movement source identification unit
13 information acquisition unit
14 determination unit
15 transmission unit
30 home subscriber information management apparatus
32 subscriber information store unit
33 congestion state detection unit
34 congestion process unit
100, 200 mobile communication control apparatus
130 priority class information

The invention claimed is:

1. A mobile communication control apparatus comprising:
a signal reception unit that receives an addressed signal transmitted from a mobile terminal that has moved to a movement destination area corresponding to the mobile communication control apparatus from a movement source area corresponding to another mobile communication control apparatus, the addressed signal being to be addressed to a home subscriber information management apparatus;
a movement source identification unit that, when the signal reception unit receives the addressed signal, identifies the another mobile communication control apparatus corresponding to the movement source area based upon a content of the addressed signal;
an information acquisition unit that acquires, from the another mobile communication control apparatus identified by the movement source identification unit, priority class information indicating whether a transmission process of transmitting the addressed signal to the home subscriber information management apparatus is a priority process or a non-priority process;
a determination unit that determines whether or not the addressed signal is to be transmitted to the home subscriber information management apparatus based upon the priority class information acquired by the information acquisition unit; and
a transmission unit that transmits to the home subscriber information management apparatus the addressed signal in accordance with a determination result of the determination unit.

2. The mobile communication control apparatus according to claim 1,
wherein the signal reception unit receives a location registration signal from the mobile terminal that has moved to the movement destination area corresponding to the mobile communication control apparatus from the movement source area corresponding to another mobile communication control apparatus, as the addressed signal, and
wherein the determination unit determines whether or not the location registration signal is to be transmitted to the home subscriber information management apparatus based upon the priority class information acquired by the information acquisition unit.

3. The mobile communication control apparatus according to claim 2, wherein the priority class information acquired by the information acquisition unit is predetermined for a user of the mobile terminal, and indicates that a call process from the mobile terminal is performed with a priority higher than another call process from another mobile terminal.

4. A mobile communication system comprising:
the mobile communication control apparatus according to claim 1; and
the home subscriber information management apparatus,
wherein the home subscriber information management apparatus comprising:
a congestion state detection unit that detects a congestion state of the home subscriber information management apparatus; and
a congestion process unit that performs a predefined congestion process, when the congestion state detection unit detects the congestion state of the home subscriber information management apparatus, and
wherein the mobile communication control apparatus transmits the addressed signal to the home subscriber information management apparatus.

5. The mobile communication system according to claim 4, wherein when a number of transactions performed by the home subscriber information management apparatus exceeds a predefined first threshold, the congestion state detection unit detects that the home subscriber information management apparatus is in the congestion state, and
wherein when the congestion state detection unit detects that the home subscriber information management apparatus is in a first congestion state, the congestion process unit discards the addressed signal received by the signal reception unit.

6. The mobile communication system according to claim 4, wherein when a number of transactions performed by the home subscriber information management apparatus exceeds a predefined second threshold, the congestion state detection unit detects that the home subscriber information management apparatus is in the congestion state, and wherein when the congestion state detection unit detects that the home subscriber information management apparatus is in a second congestion state, the congestion process unit transmits a transmission restriction instruction signal of giving an instruction of restricting the transmission of the addressed signal, to the mobile communication control apparatus that is a transmission source apparatus of the addressed signal.

7. The mobile communication system according to claim 5, wherein when a number of transactions performed by the home subscriber information management apparatus exceeds a predefined second threshold, the congestion state detection unit detects that the home subscriber information management apparatus is in the congestion state, and wherein when the congestion state detection unit detects that the home subscriber information management apparatus is in a second congestion state, the congestion process unit transmits a transmission restriction instruction signal of giving an instruction of restricting the transmission of the addressed signal, to the mobile communication control apparatus that is a transmission source apparatus of the addressed signal.

8. A mobile communication control method comprising steps of:

receiving an addressed signal transmitted from a mobile terminal that has moved to a movement destination area corresponding to a mobile communication control apparatus from a movement source area corresponding to another mobile communication control apparatus, the addressed signal being to be addressed to a home subscriber information management apparatus;

identifying, when the addressed signal is received by the receiving step, the another mobile communication control apparatus corresponding to the movement source area based upon a content of the addressed signal;

acquiring, from the another mobile communication control apparatus identified by the identifying step, priority class information indicating whether a transmission process of transmitting the addressed signal to the home subscriber information management apparatus is a priority process or a non-priority process;

determining whether or not the addressed signal is to be transmitted to the home subscriber information management apparatus based upon the priority class information acquired by the acquiring step; and transmitting to the home subscriber information management apparatus the addressed signal in accordance with a determination result of the determining step.

9. A non-transitory medium storing a mobile communication control program for causing a computer to perform steps of:

receiving an addressed signal transmitted from a mobile terminal that has moved to a movement destination area corresponding to a mobile communication control apparatus from a movement source area corresponding to another mobile communication control apparatus, the addressed signal being to be addressed to a home subscriber information management apparatus;

identifying, when the addressed signal is received by the receiving step, the another mobile communication control apparatus corresponding to the movement source area based upon a content of the addressed signal;

acquiring, from the another mobile communication control apparatus identified by the identifying step, priority class information indicating whether a transmission process of transmitting the addressed signal to the home subscriber information management apparatus is a priority process or a non-priority process;

determining whether or not the addressed signal is to be transmitted to the home subscriber information management apparatus based upon the priority class information acquired by the acquiring step; and transmitting to the home subscriber information management apparatus the addressed signal in accordance with a determination result of the determining step.

* * * * *

UNITED STATES PATENT AND TRADEMARK OFFICE
CERTIFICATE OF CORRECTION

PATENT NO. : 9,277,441 B2
APPLICATION NO. : 14/345078
DATED : March 1, 2016
INVENTOR(S) : Toru Hasegawa and Hironari Kobayashi It is certified that error appears in the above-identified patent and that said Letters Patent is hereby corrected as shown below:

Title Page, item (54) and in the Specification, Column 1, line 3, in the title, the second occurrence of the term 'MOBILE' should read -- HOME --.

Signed and Sealed this
Twenty-first Day of June, 2016

Michelle K. Lee
*Director of the United States Patent and Trademark Office*